(12) United States Patent
Jones et al.

(10) Patent No.: US 7,575,000 B2
(45) Date of Patent: Aug. 18, 2009

(54) GRILL WITH INDEPENDENT HEATING ZONES

(75) Inventors: Douglas J. Jones, New Port Richey, FL (US); Roberto Nevarez, Hudson, FL (US)

(73) Assignee: Garland Commercial Industries LLC, Freeland, PA (US)

( * ) Notice: Subject to any disclaimer, the term of this patent is extended or adjusted under 35 U.S.C. 154(b) by 0 days.

(21) Appl. No.: 11/431,867

(22) Filed: May 10, 2006

(65) Prior Publication Data

US 2006/0201495 A1 Sep. 14, 2006

(51) Int. Cl.
*F24C 3/00* (2006.01)
(52) U.S. Cl. .................... 126/39 H; 126/39 N; 126/39 J
(58) Field of Classification Search ............... 126/39 H, 126/39 N, 39 J, 39 BA; 99/349, 422; 219/450.1, 219/465.1
See application file for complete search history.

(56) References Cited

U.S. PATENT DOCUMENTS

| | | | |
|---|---|---|---|
| 3,843,315 A | 10/1974 | Sorenson | |
| 4,788,414 A | 11/1988 | Schreder | |
| RE32,994 E | 7/1989 | Adamson et al. | |
| 4,878,424 A * | 11/1989 | Adamson | 99/349 |
| 5,062,788 A * | 11/1991 | Best | 431/7 |
| 5,197,377 A | 3/1993 | Jennings et al. | |
| 5,341,727 A | 8/1994 | Dickson | |
| 6,614,007 B1 | 9/2003 | Reay | |

* cited by examiner

*Primary Examiner*—Alfred Basichas
(74) *Attorney, Agent, or Firm*—Ohlandt, Greeley, Ruggiero & Perle, L.L.P.

(57) ABSTRACT

A grill having a platen with a plurality of heating zones. Each heating zone has a heating unit. Thermal transfer between adjacent heat zones is limited by air gaps and insulation. The heater unit of each zone has a heater that is disposed to attain substantially uniform temperature of the platen for that zone before a temperature sensor senses a set temperature during either pre-heat or recovery modes.

13 Claims, 11 Drawing Sheets

GRILL WITH INDEPENDENT HEATING ZONES

RELATED APPLICATION

This application claims priority of U.S. application Ser. No. 10/691,130, filed on Oct. 22, 2003, that claims priority of U.S. Provisional Application No. 60/420,179, filed on Oct. 22, 2002, the entire contents of which are incorporated by reference.

FIELD OF THE INVENTION

This invention relates to a grill with a plurality of separately controlled heating zones and, also, to a clamshell grill in which the griddle is disposed.

BACKGROUND OF THE INVENTION

Conventional griddle plates or platens are made from steel or cast iron and are heated by tubular sheathed elements as, for example, disclosed in U.S. Pat. No. 3,843,315. The heating elements are maintained in contact with the underside of the griddle plate by a clamping system to maximize heat transfer and prevent overheating of the heating elements. The clamping system involves a substantial and often complex metal fabrication that adds cost and weight to the cooking appliance. The clamping system is secured to the griddle plate by a large number of studs that are screwed into holes or welded on to the griddle plate. This also adds cost and weight to the cooking appliance.

A non-contact grill is described in U.S. Pat. No. 6,614,007 as having one or more separate heater boxes secured to the underside of the griddle plate. Separate infrared heating elements are disposed in the heating boxes so as to be separated by a gap from the underside of the griddle plate. This arrangement provides a substantially uniform heating to the underside of the griddle plate.

It is desirable to have a grill that attains a substantially uniform temperature during pre-heat and recovery modes. It is also desirable to have a grill with separate heating zones that can be independently operated such that the heat of an operating zone does not significantly affect the heating of an adjacent zone.

Thus, there is a need for a grill that attains a substantially uniform temperature throughout its platen during pre-heat and recovery modes.

There is also a need for a grill with heating zones that have minimal heat migration to adjacent zones.

SUMMARY OF THE INVENTION

In a first embodiment of the present invention, a grill comprises a platen and a temperature sensor disposed in thermal contact with the platen. A heater box is disposed on one side of the platen. A heater is disposed in the heater box in a manner that the platen attains a substantially uniform temperature before the temperature sensor senses a set temperature, which ends a pre-heat mode or a recovery mode.

In one aspect of the first embodiment, the heater is arranged to provide minimal and maximum heat to first and second portions of the platen. The first portion of the platen is in the vicinity of the temperature sensor and the second portion of the platen is outside the vicinity.

In a second embodiment of the present invention, the heater comprises a gas burner having a first group of ports disposed to provide the minimal heat and a second group of ports disposed to provide the maximal heat. In one aspect of this embodiment, the second group has more ports than the first group.

In a third embodiment of the present invention, the heater comprises a gas burner that has a surface in which an array of ports is disposed in column sequences that are separated by rows. Preferably, each of the column sequences includes a plurality of ports and each of the rows includes a plurality of the ports. Most preferably, the column sequences and rows define first and second groups that are disposed inside the vicinity and outside the vicinity. The first group may have a smaller number of ports per row than the second group.

In the second or third embodiments the gas burner may have a rectangular shape, a rectangular cross-section and/or a flat surface.

In a fourth embodiment of the present invention, the heater comprises an electrical heater having a first electrical element and a second electrical element disposed to provide the minimal heat and the maximal heat of the second embodiment. Preferably, adjacent runs of the first electrical element have a larger spacing than adjacent runs of the second electrical element.

According to another aspect of the aforementioned embodiments of the present invention, the temperature sensor is disposed in a shield and separated therefrom by an air gap.

In a fifth embodiment of the present invention, a grill comprises a plurality of heater boxes disposed on one side of a platen in an arrangement that provides a plurality heating zones for the platen. Separate heaters are disposed in the heater boxes. The heater boxes are configured to have minimal heat migration therebetween so that the heating zones are capable of independent heating control for operation separately or in any combination thereof. Preferably, each of the heater boxes is separated from a neighboring heater box by an air gap. Most preferably, each of the heater boxes comprises an insulation liner to minimize heat transfer to a neighboring heater box.

In other embodiments of the present invention, the grill of the fifth embodiment may comprise the gas burner of the second or third embodiments or the electric heater of the fourth embodiment.

In a sixth embodiment of the present invention, the heaters define separate zones. The heater disposed in a first heater box is arranged to provide minimal and maximum heat to first and second portions of the platen in a first of one of the zones corresponding to the first heater box.

In a seventh embodiment of the present invention, a temperature sensor is disposed in the first heater box. The first portion of the platen is in the vicinity of the temperature sensor and the second portion of the platen is outside the vicinity.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
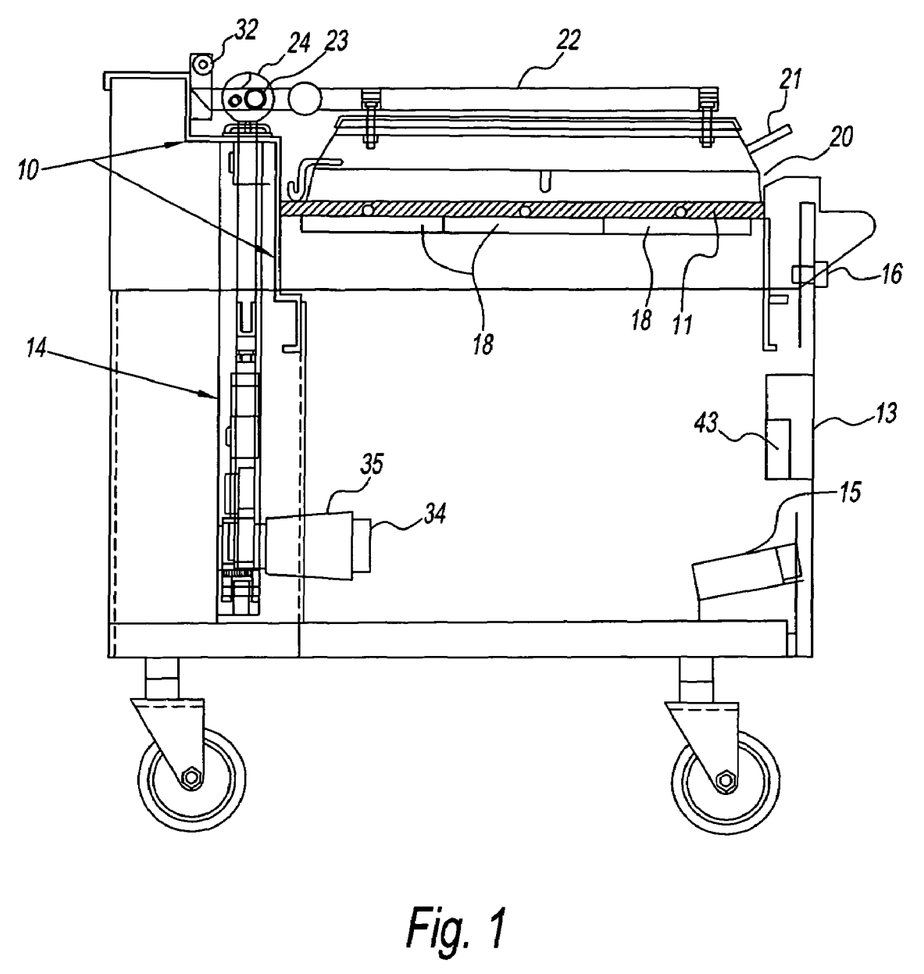
FIG. 1 is a side elevation view of a clamshell grill using the griddle of FIG. 1 or 7, shown with the upper platen in its fully lowered position.
Figure 2:
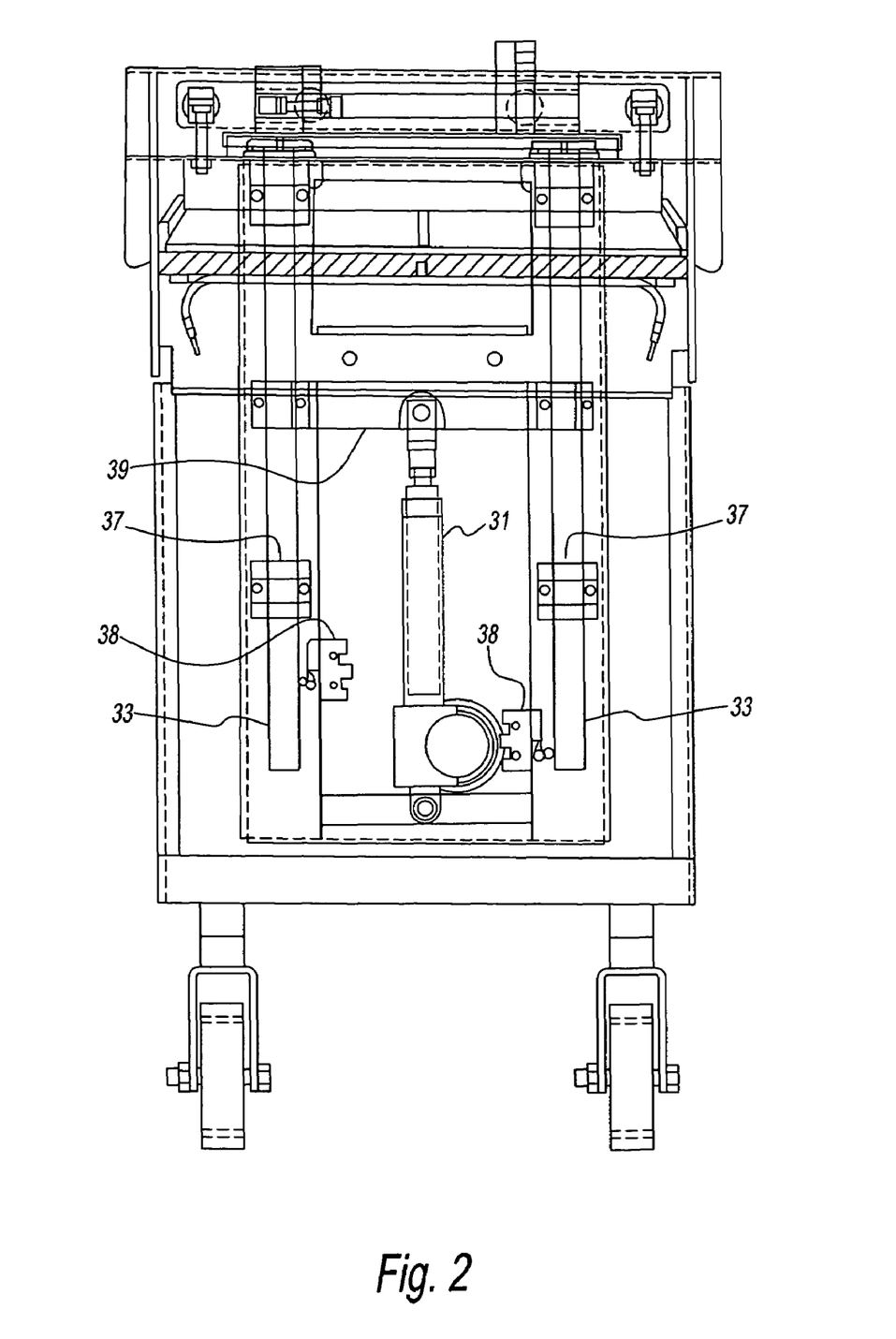
FIG. 2 is a rear schematic view of the clamshell grill of FIG. 1.
Figure 3:
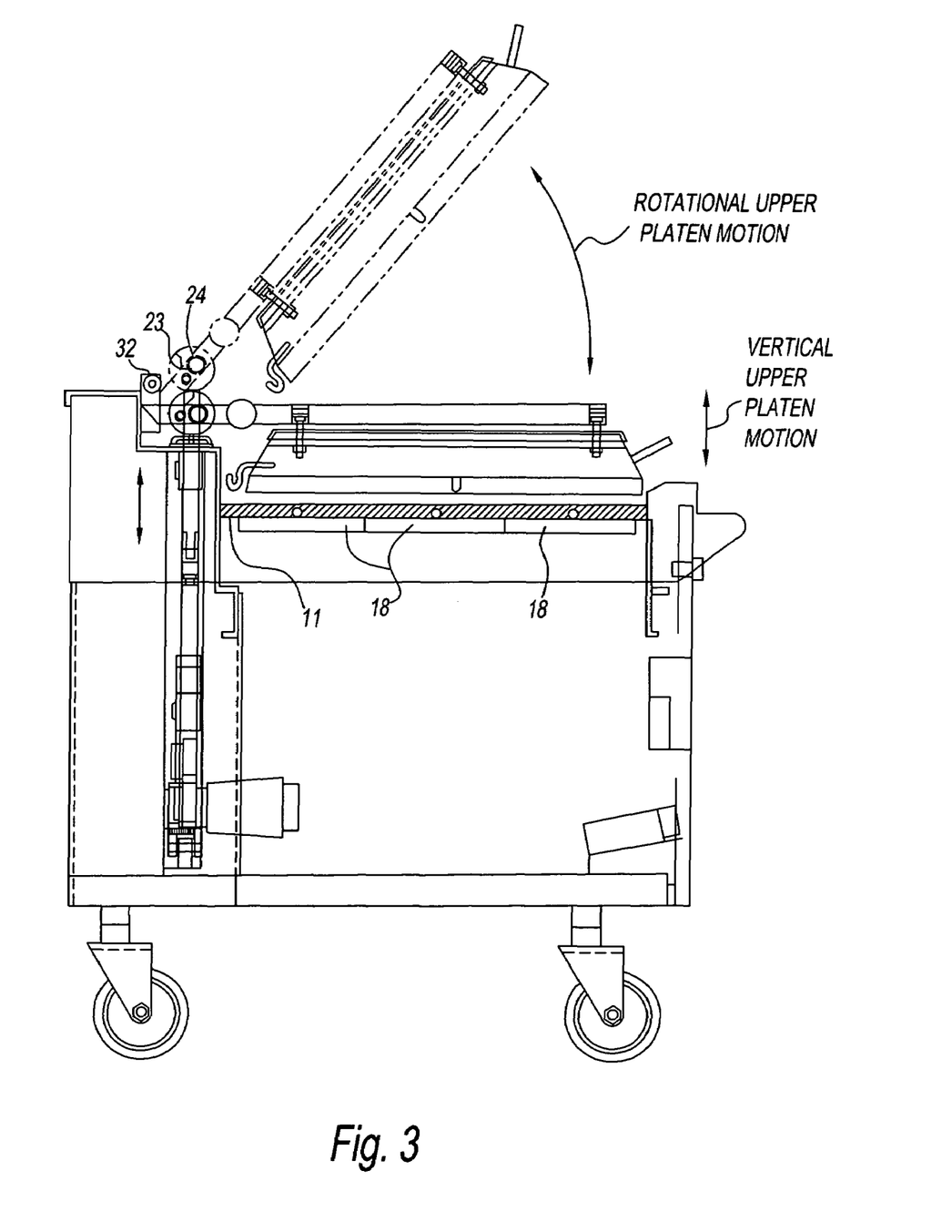
FIG. 3 is a progressive presentation of the clamshell grill of FIG. 1 showing the motion of the upper platen.

Referring to FIGS. 1-3, a preferred configuration of a clamshell grill embodiment of the present invention comprises a support structure 10 to which a lower cooking platen 11 is horizontally mounted. Lower platen 11 has a smooth level cooking surface on its upper side and corresponds to the griddle plate of the gas or electric griddle embodiments of FIG. 4 or 10. Lower platen 11 is heated to cooking temperature by a plurality of heating units 18, which may be gas or electric. By way of example, three heating units 18 are shown. In this embodiment, lower platen 11 is of substantial dimension, for example two feet by three feet, to accommodate large numbers of food items at once.

An upper platen assembly is movably mounted to the rear of support structure 10 by means of a positioning mechanism. The upper platen assembly comprises an upper cooking platen 20 heated to cooking temperature by heating elements mounted within a casing. Upper cooking platen 20 is either smaller than or equivalently sized to lower cooking platen 11. Upper platen 20 has a handle 21 mounted on its front side for manual manipulation of the upper platen assembly. In a preferred embodiment, two separate upper platen assemblies are mounted over a single lower platen, allowing for greater flexibility for the cook/operator.

The positioning mechanism facilitates two distinct motions by upper platen 20 from its uppermost position to a cooking position. In this embodiment, a linear actuator 31 is linked to two vertical reciprocating shafts 33 by an actuator cross bar linkage 39. Actuator cross bar linkage 39 is clamped to vertical reciprocating shafts 33, which run through linear motion bearings 37. Vertical shafts 33 are affixed to arm pivot/stop heads 24. Cantilever bars 22 run through arm pivot/stop heads 24 through rotational pivot bearings 23. When upper platen 20 is in its uppermost rotational position (see FIG. 3), linear actuator 31 is extended to its maximum position, vertical reciprocating shafts 33 and arm pivot/stop heads 24 are extended upward and to a position which forces the back end of cantilever bars 22 to contact rotational bearing 32 forcing rotational motion of upper platen 20 to an angle of approximately 54° from the horizontal. When linear actuator motion is reversed, upper platen 20 descends both vertically and through an arc caused by the cantilever weight of upper platen 20 maintaining contact between rotational bearing 32 and back of cantilever bars 22. When cantilever bars 22 and upper platen 20 become parallel with lower platen 11, the stop portion of arm pivot/stop head 24 stops the rotational motion of cantilever bars 22 causing purely vertical motion of upper platen 20 from this point and further down to any of the cooking positions.

The linear actuator assembly comprises a drive motor 35, a linear actuator 31, two substantially vertical reciprocating shafts 33 and position sensor switches 38. Linear actuator 31, when activated, moves upper platen 20 vertically while the cantilever weight of upper platen 20 maintains contact between arm pivot/stop head 24 until the back of cantilever bar 22 makes contact with rotational bearing 32. This movement ensures that upper platen 20 is constantly parallel to lower platen 11 during this stage of upper platen travel. Once cantilever bar 22 makes contact with rotational bearing 32 the vertical motion is changed to rotational motion to a point where upper platen 20 is raised to the point at which an upper position sensor switch 39 is set (approximately 54° above horizontal). An audible signal is sounded five seconds prior to the start of upward platen movement to alert the operator of impending upper platen movement. When activation buttons 16 are depressed simultaneously to start a cooking cycle, a user interface controller 13 sends information to a motor position controller 15. This information is used by motor position controller 15 to activate linear drive motor 35. The action of the rotational motion of linear drive motor 35 causes electrical pulses to be generated by a positioning pulse encoder 34. The pulses generated by positioning pulse generator 34 are received by motor position controller 15. This information and the activation of lower position sensor switch 38 allows motor controller 15 to accurately position the entire drive system to a predetermined upper platen position for cooking.

A computer control is, in this embodiment, mounted behind an access plate contained in a simple user-friendly interface 13 located on the front display of the grill. This interface comprises a control panel including an alpha-numeric digital display panel, operating switches and buttons (not shown), and LED indicator lights (not shown). Two activation buttons (not shown) must be pressed simultaneously by the operator to start the movement of upper platen 20 into cooking position. The control panel 13 is sealed behind a polyester cover for protection. Data is accepted by the computing device, typically a microprocessor 43 and additionally, in this embodiment, an EPROM (not shown) pre-programmed with relevant operating or cooking parameters, from control panel 13, temperature sensors, position indicators 38, and timer circuitry (not shown). The EPROM is capable of storing a variety of programs, including: menu items, whether individual foods are active or inactive menu items, cooking functions, temperature settings, gap settings, cooking times, and end of cook cycle protocols. The EPROM is easily accessible behind its panel on the control board. This allows for easy substitution in the case of a defect or a change in desired programming.

To illustrate, a typical cooking cycle will be outlined. The grill apparatus begins in an inactive state, with its upper platen 20 in its fully opened and raised position. The upper platen 20 is at an angle of 54° from horizontal. The operator will select the relevant product setting, e.g., quarter-pound hamburgers, from the menu on control panel 13, then will load the frozen hamburger patties a single layer thick across the surface area of lower platen 11 which will be covered by upper platen 20 when it is lowered. This area may be marked on lower platen 11 for easy reference. When loading is complete, the operator will simultaneously depress the "raise platen" and "standby" buttons (not shown), which are physically offset from one another, to initiate the cook cycle.

At this point several things occur. The temperature sensing thermocouple probes (not shown) located in the lower and upper platens (11, 20) will be sending data to microprocessor 43 and sensing the temperature of the platens. Microprocessor 43 will activate heating elements 12 in lower platen 11 and similar heating elements (not shown) in upper platen 20 when appropriate. At the same time, upper platen 20 will begin its two-phase descent into cooking position. Microprocessor 43 will receive data from positioning pulse encoder 34 and lower sensor switch 38 indicating the relative height of vertical reciprocating shafts 33. The positioning pulse encoder 34 will also provide continuous data on the offset distance between the two positioning switch 38 sites. The pulses received by positioning pulse encoder 34 are monitored and must remain constant for upper platen 20 to remain in proper horizontal level. Positioning pulse encoder 34 and lower sensor switch 38 will indicate that upper platen 20 is in its most open, uppermost position. Microprocessor 43 will then activate actuator drive motor 35 which drives linear actuator 31 to begin to lower arm pivot/stop head 24. This motion (combined with the cantilevered weight of upper platen 20) will cause the ends of cantilever bars 22, which are in direct contact with rotational bearings 23, to begin to rotate downward and in a clockwise fashion (when viewed from the side view of FIG. 1) around rotational bearings 32. This, in turn, will cause upper platen 20 to begin to tilt downwards towards horizontal alignment with lower platen 11. In this motion, cantilever bars 22 pivot rotational bearing 32 and the back of cantilever bars 22 roll along the rotational bearing through approximately a 54° arc, and the front edge of upper platen 20 will descend, describing the same 54° arc. The microprocessor will control drive motor 35 throughout this movement so that upper platen 20 is lowered slowly and evenly to minimize any possible safety risks.

The cantilever bars 22 will continue rotating clockwise around rotational bearings 32 until the rear end of the bars engage the stop portion of arm pivot/stop heads 24. This halts the rotational movement of cantilever bars 22 and of upper platen 20. At this point, linear drive motor 35 will continue to lower arm pivot/stop head 24. Because the ends of cantilever bars 22 can no longer rotate due to contact with the stop portion of arm pivot/stop heads 24 there is no more rotation of cantilever bars 22 and upper platen 20 for the remainder of vertical movement imparted by linear drive motor 35 into the system. Thus all motion will now be non-rotational.

The upper platen 20 is now parallel to and suspended above lower platen 11 and hamburger patties. As linear actuator 31, driven by linear drive motor 35, and controlled by motor positioning controller 15, continues to lower arm pivot/stop head 24 and cantilever bars 22, upper platen 20 descends to a predetermined position above lower platen 11. This position was programmed into user interface control 13 for the specific product to be cooked. The positioning pulse encoder 34 will be sending calibrated height data to microprocessor 43. Any inconsistent data will trigger an error or servicing message on interface 13, and an audible alarm. The height data will pinpoint the height of upper platen 20 above lower platen 11, and above the particular food item to be cooked.

Microprocessor 43 will stop linear drive motor 35 at the exact point set forth in its programming for the beginning of the cook cycle. This height measurement is derived from prior testing data on standardized menu items to provide optimal cooking contact and pressure. The microprocessor is capable of controlling the gap setting to a very precise degree, down to (+/−) 0.0015 inch gradations.

The cooking cycle can be canceled by depressing raise/lower button 16. This allows the operator to change menu selections or other operating parameters.

Microprocessor 43 will sound an audible signal five seconds prior to the conclusion of the cooking timing sequence to alert the operator that the cooking process has been completed and to be ready to begin the process of removing the finished food product. When microprocessor 43 determines that the preset cooking cycle is complete, it automatically restarts the drive motor 35 in the opposite direction causing linear actuator 31 to exert upward force on arm pivot/stop head 24, cantilever bars 22, and upper platen 20. The upward thrust of linear actuator 31 causes arm pivot/stop head 24 and connected upper platen 20 to begin to move upward. The upper platen 20 remains parallel to lower platen 11 and the cooked food products as it lifts away from them. Then, when the ends of cantilever bars 22 again engage rotational bearings 32 the vertical force of linear actuator 31 causes cantilever bars 22 to rotate about rotational pivot bearing 23 in arm pivot/stop head 24 converting the purely vertical motion of upper platen 11 to both vertical and rotational motion, with the ends of bars 22 rotating counterclockwise (as viewed in FIG. 3) about rotational bearings 32 and the front end of upper platen 11 arcing upward until the maximum angle is achieved (approximately 54°). At that point microprocessor 43 halts drive motor 35 and effectively locks upper platen 11 into place.

The uppermost position of upper platen 20 provides clear access to the cooked product for easy removal and for cleaning of the upper and lower platen surfaces. If upper platen 20 moved only horizontally, even in a raised position it would be difficult to see and access food items toward the rear of lower platen 11. If upper platen 20 only rotated about fixed points of attachment on its rear edge, the forward edge of upper platen 20 would potentially remain in a dangerous position. An operator unloading food at the rear of lower platen 11 would run a greater risk of hitting or burning his head on the forward edge. In addition, the rear edge of upper platen 20 would be substantially closer to lower platen 11 reducing the clearance for utensils and hands, increasing the possibility of burn injury from accidental contact with the upper platen cooking surface.

Once again, throughout this two-phase upward motion, microprocessor 43 is receiving and monitoring data inputs from positioning pulse encoder 34 and position sensor switches 38 on vertical reciprocating shafts 33. The offset distance between the two positioning sensor switches 38 must remain constant to keep upper platen 20 in the proper position relative to lower platen 11. The distance traveled by vertical reciprocating shafts 33 tells microprocessor 43 the upper platen's relative location in its traverse. It can be appreciated that the center and rear edge of upper platen 20 also move through the same 54° arc that the front edge travels during the rotational movement. The chords of those arcs are respectively shorter, however, in proportion with their distance from the rotational bearings 32.

For optimal cooking results, microprocessor 43 can be programmed to follow the following steps: precisely apply pressure to the food item to sear the underside of the food; raise the upper platen 20 to release any trapped steam from the food; and precisely lower upper platen 20 again to apply pressure to the food and sear the upper surface of the food. This pressure is then precisely controlled through the remainder of the cooking process. This improved process can create a finished food product having improved appearance and taste, as compared to food produced by a conventional two-sided cooking process.

The upper platen drive system has a safety system built into microprocessor 43 which monitors the amperage of the motor of upper platen 20 when in motion. If microprocessor 43 receives information from linear actuator 35 that is outside the window of acceptable amperage, microprocessor 43 determines that there is some problem causing impairment of motion. If upper platen 20 was descending, microprocessor 43 will stop linear drive motor 35 and output an alarm sound and display an error message on user interface 13. If upper platen 20 is in an upward motion when an obstruction is encountered, the microprocessor will reverse the motion of upper platen 20 and move it to a position approximately one inch above lower platen 11 and again output an alarm sound and display an error message on the user interface control display 13. After either of the above events occur, the power to the controls must be reset in order for automatic motion of upper platen 20 to be reinitiated.

Figure 4:
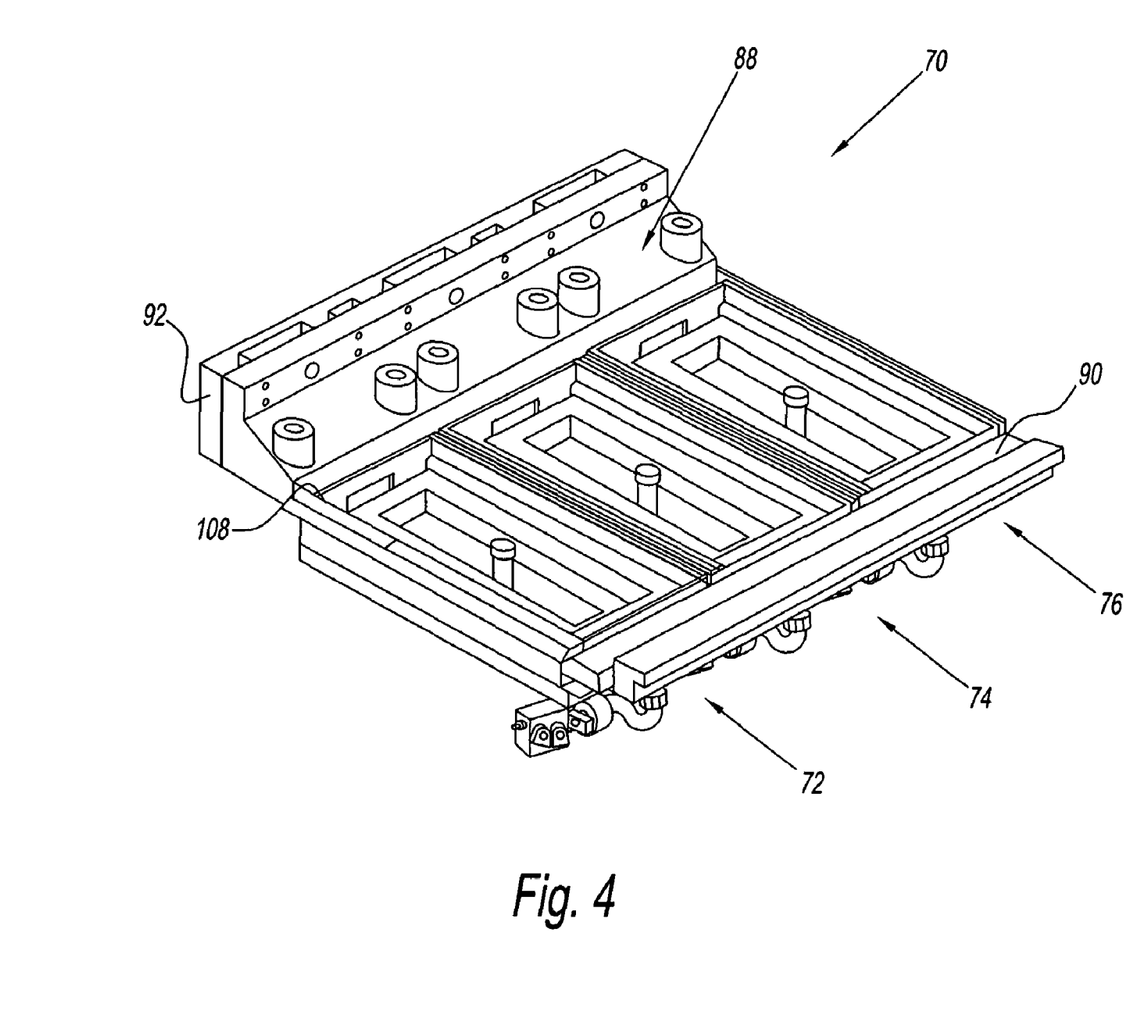
FIG. 4 is a perspective view of a gas griddle according to the present invention with griddle plate removed.
Figure 5:
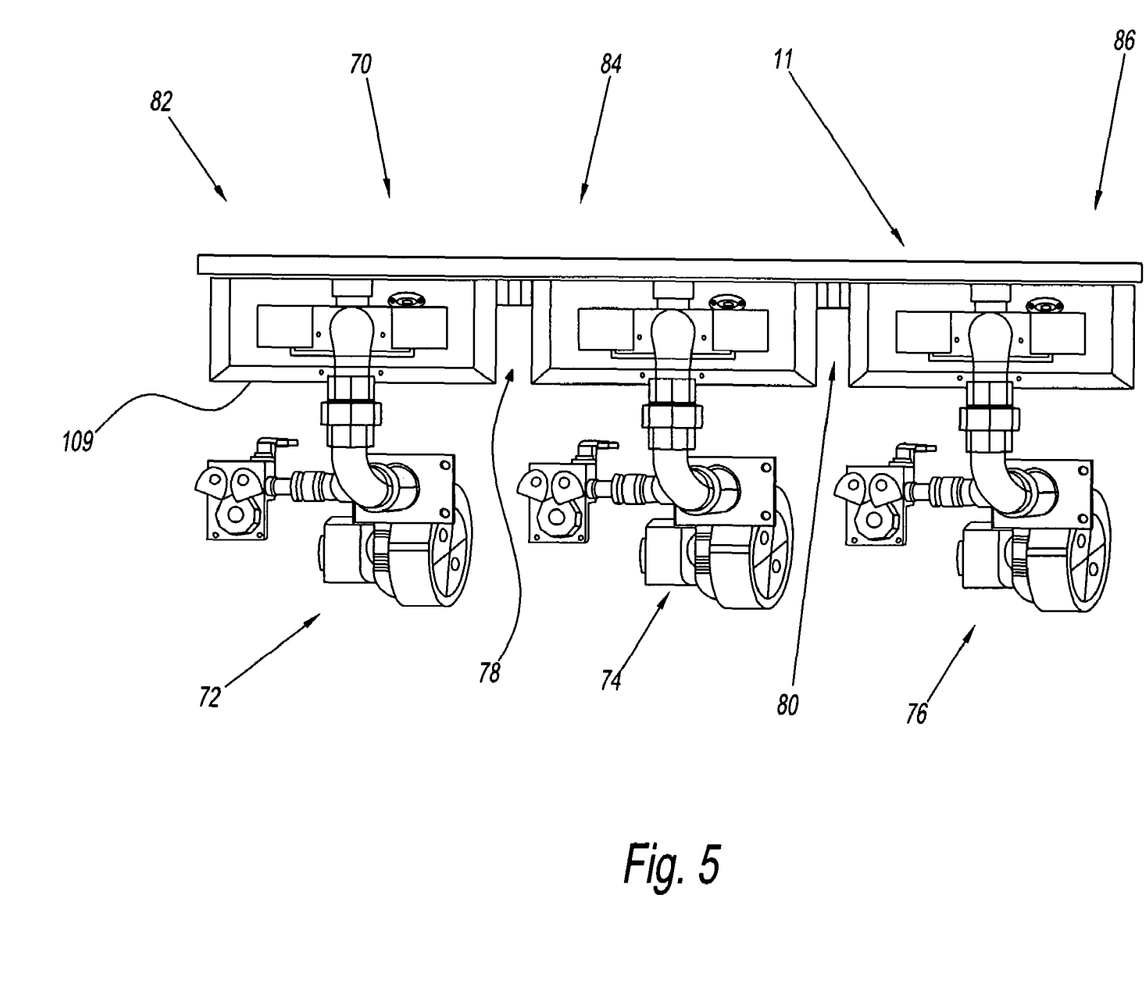
FIG. 5 is a front view in elevation of the gas griddle of FIG. 4 with the griddle plate in place, but without the griddle sides.
Figure 6:
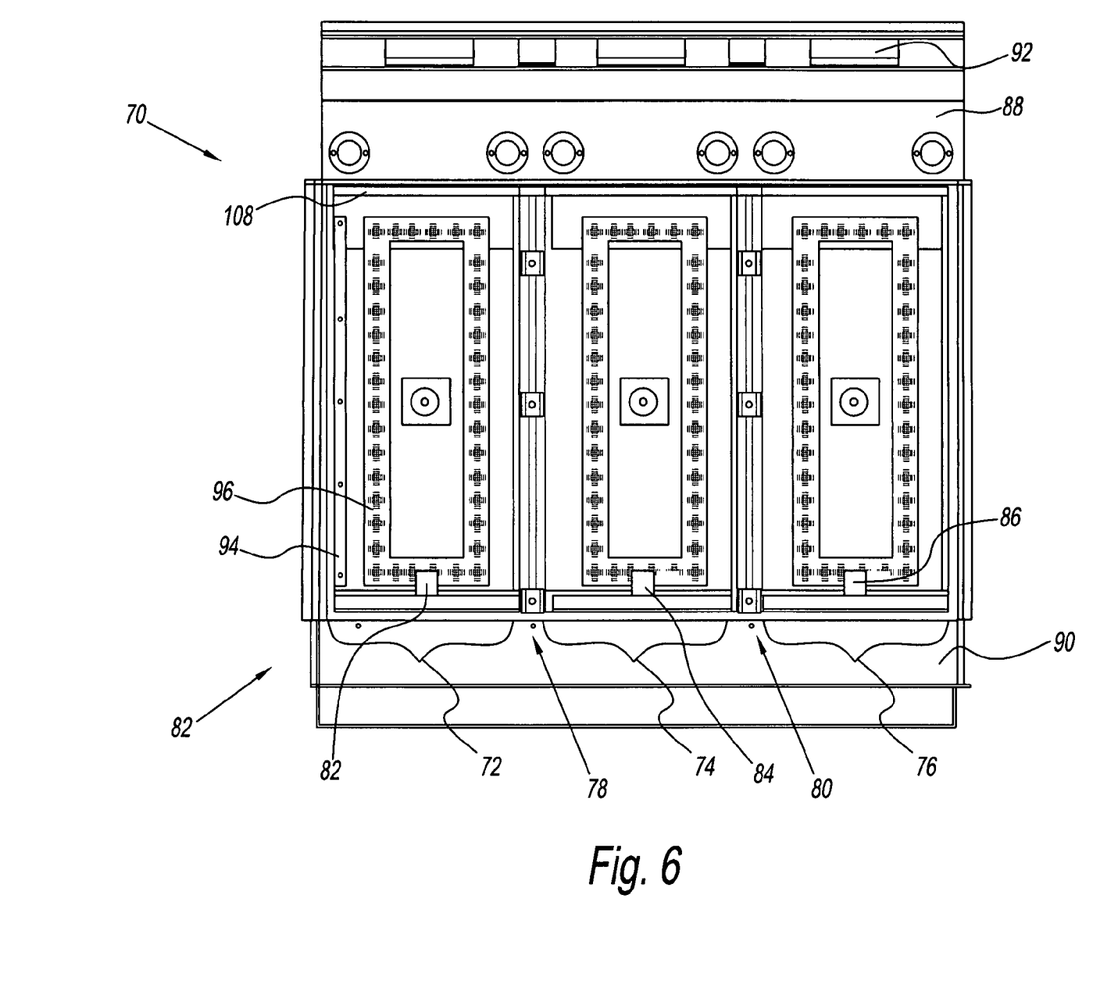
FIG. 6 is a top view of the gas griddle of FIG. 4.

Referring to FIGS. 4-6, an embodiment of the present invention is shown as a gas griddle 70 that has a plurality of separate and independent heating zones 72, 74 and 76 for heating a single contiguous griddle plate or platen 11 (shown in FIG. 5). Individual heating zones 72, 74 and 76 are disposed in an array adjacent platen 11. Although only three heating zones are shown in the drawing, it will be apparent to those skilled in the art that two, three or more heating zones can be used. Adjacent heating zones 72, 74 and 76 are separated from one another by air gaps 78 and 80 as shown in FIGS. 5 and 6. Air gaps 78 and 80 minimize heat migration between heating zones 72, 74 and 76.

Gas griddle 70 includes three heating units 82, 84 and 86 disposed in heating zones 72, 74 and 76, respectively, as shown in FIGS. 5 and 6. Heating units 82, 84 and 86 may be used as heating units 18 of the embodiment of FIGS. 1-3. Heating units 82, 84 and 86 are each in thermal contact with a back heat sink 88 and a front heat sink 90. Back heat sink 88 is in contact with a flue guard 92 shown in FIGS. 4 and 6.

Figure 7:
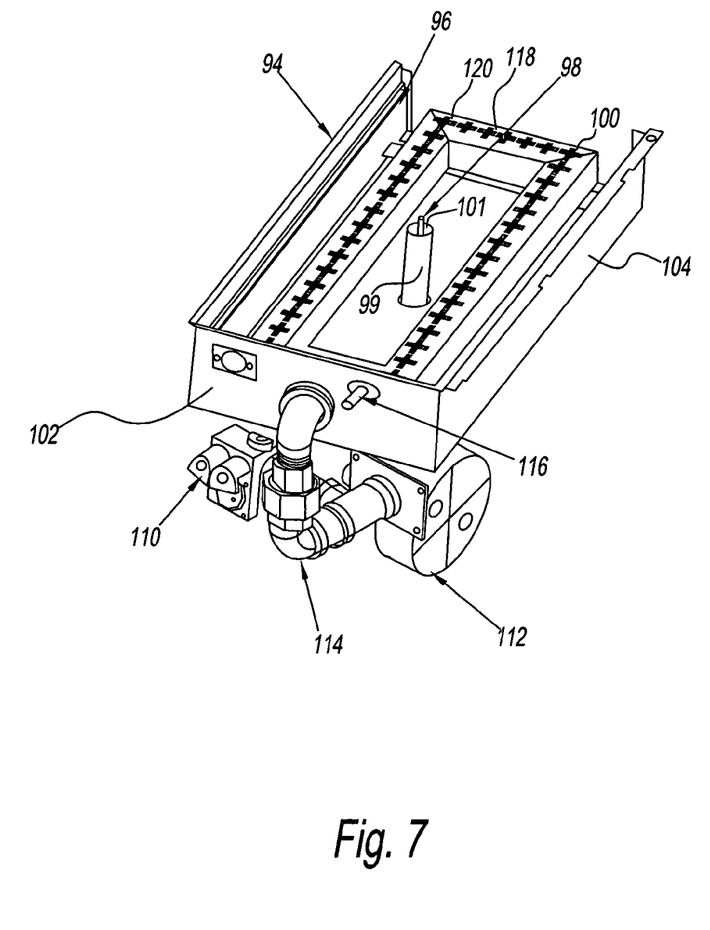
FIG. 7 is a perspective view of a single zone of the gas griddle of FIG. 4.
Figure 8:
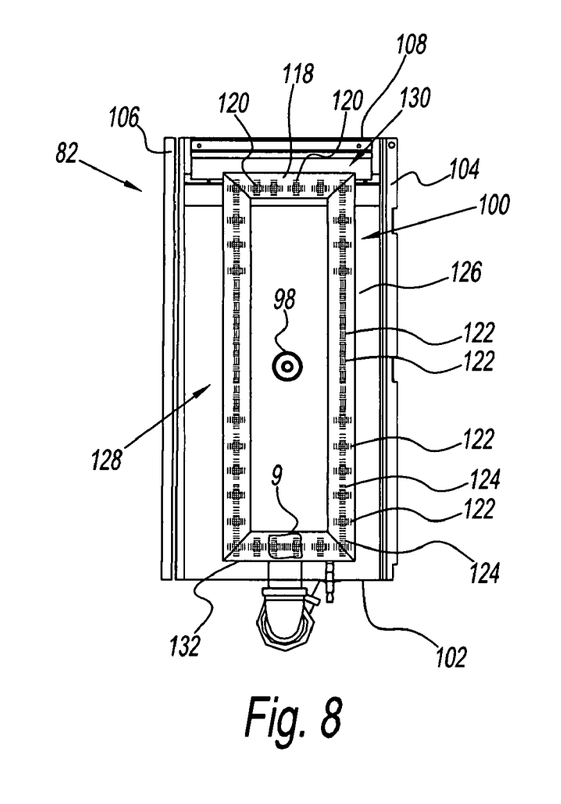
FIG. 8 is a top view of single zone of the gas griddle of FIG. 4.

Heating units 82, 84 and 86 are substantially identical so only heating unit 82 will be described in detail. Referring to FIGS. 7 and 8, heating unit 82 includes a gas burner box 94 in which is disposed an insulation liner 96, a temperature sensor 98 and a gas burner 100. Gas burner box 94 includes a front wall 102, a back wall 108 and a bottom wall 109 (shown most clearly in FIG. 5). Front wall 102 and back wall 108 are in thermal communication with front heat sink 90 and back heat sink 88, respectively, as shown in FIGS. 4 and 6. Insulation liner 96 is disposed along the interior of front wall 102, back wall 104, side walls 104 and 106 and bottom wall 109. Temperature sensor 98 extends through bottom wall 109 and through a closed region of gas burner 100 so as to be in thermal contact with griddle platen 11.

Gas burner 100 is controlled by valving that includes a gas inlet valve 110, a blower 112, and a feed pipe 114. Gas inlet valve 110 and blower 114 are in fluid communication with feed pipe 114. Thus, gas inlet valve 110 and blower 112 are operative in a fuel supplying mode to respectively provide gas and air to feed pipe 114. Feed pipe 114 extends through front wall 102 to provide the gas and air mixture to gas burner 100. Gas burner 100 preferably has a rectangular shape with outlet ports disposed to face upwardly toward griddle platen 11. An igniter 116 also extends through front wall 102 to ignite the fuel flow that is at a top surface 118 of burner 100. A controller (not shown) can operate the gas inlet valve 110, blower 112 and igniter 116 automatically. Alternatively, the gas inlet valve 110, blower 112 and igniter 116 can be operated manually.

Gas burner 100 is preferably arranged in a rectangular shape and preferably has a rectangular cross section. Thus, gas burner 100 has two long sides 126 and 128 and two short sides 130 and 132. A plurality of apertures or ports 120 is arranged on top surface 118 of gas burner 100. Top surface 118 is preferably flat so as to provide a maximum flame contact with griddle platen 11 vis-à-vis a rounded surface. The burner elements are preferably "Blue Flame Power Burners" available from Wayne Burners.

Referring to FIG. 8, ports 120 are in an array that has sequences of port rows 122 interleaved with sequences of port columns 124. The array has a lesser number of ports 120 in the portions of long sides 126 and 128 of gas burner 100 in the vicinity of temperature sensor 98 than in all other portions of long sides 126 and 128 and short sides 130 and 132 of gas burner 100. This is preferably accomplished by using a smaller number of ports 120 in rows 122 located in the vicinity of temperature sensor 98. This assures that during preheat and recovery modes temperature sensor 98 does not prematurely sense a set temperature before the portions of platen 11 outside the vicinity of temperature sensor 98 reach the set temperature. That is, the port array applies maximum heat in heating zone 70 to the portions of platen 11 that are outside the vicinity of temperature sensor 98 and minimum heat to the portions of platen 11 that are within the vicinity of temperature sensor 98. This allows the entire part of platen 11 in heating zone 70 to attain a substantially uniform temperature before temperature sensor 98 senses the set temperature, which then terminates the pre-heat mode or the recovery mode. This assures that platen 11 will have a mostly uniform temperature during the entire cooking process.

Referring to FIG. 7, temperature sensor 98 is disposed in a shield 99 so as to be spaced therefrom by an air gap 101. This provides an additional reduction in thermal transfer rate from platen 11 to temperature sensor 98 during pre-heat and recovery modes.

Figure 9:
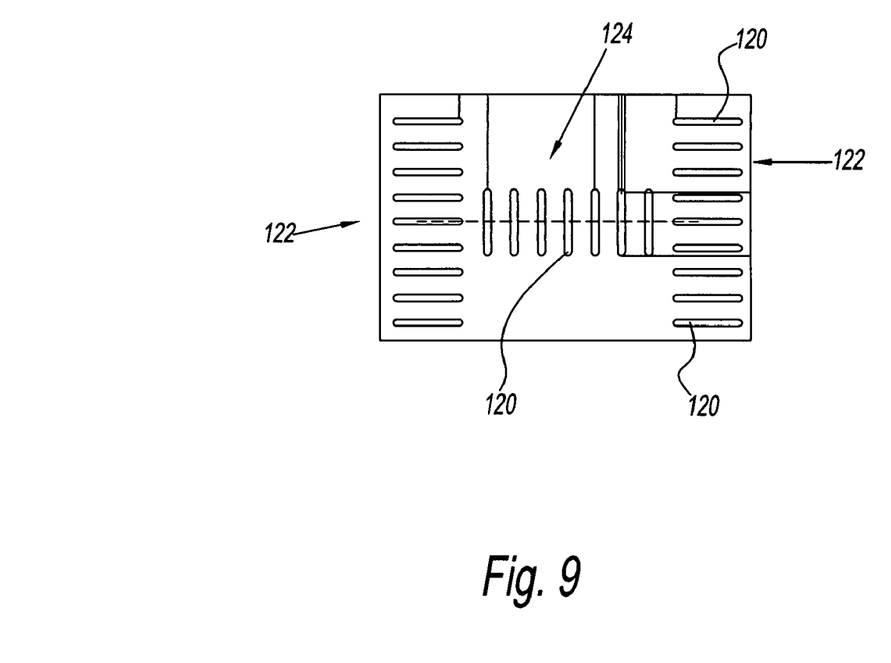
FIG. 9 is a top view of the encircled area 9 of FIG. 8.

Referring to FIG. 9, ports 120 in port rows 122 and port column 124 preferably have an elongated rectangular or slot shape so as to deliver maximum uniform flame to platen 11.

To compensate for a difference of materials used for front heat sink 90 and back heat sink 88, ports 120 are disposed in long sides 128 and 130 so that more ports are located near front wall 102 of gas burner box 82 than are located near back wall 108. For example, more rows 122 are located between the center of burner 100 and front side 102 than between the center and back side 108.

Gas griddle 70 has a plurality of heating zones 72, 74 and 76 that have minimal heat migration therebetween due to air gaps 78 and 80, insulated heater units 82, 84 and 86 and/or heat sinks 88 and 90. As a result, each heating zone can be used independently of the other heating zones with minimal heat migration from one zone to an adjacent zone. That is, heating zones 72, 74 and 76 can be operated independently, one at a time, or simultaneously in various combinations. For example, heating zone 72 can be turned on and heating zones 74 and 76 can be turned off. For this scenario, the portions of platen 11 over lying heating zones 74 and 76 will be cool enough for use as a storage area while zone 72 is used for cooking.

Figure 10:
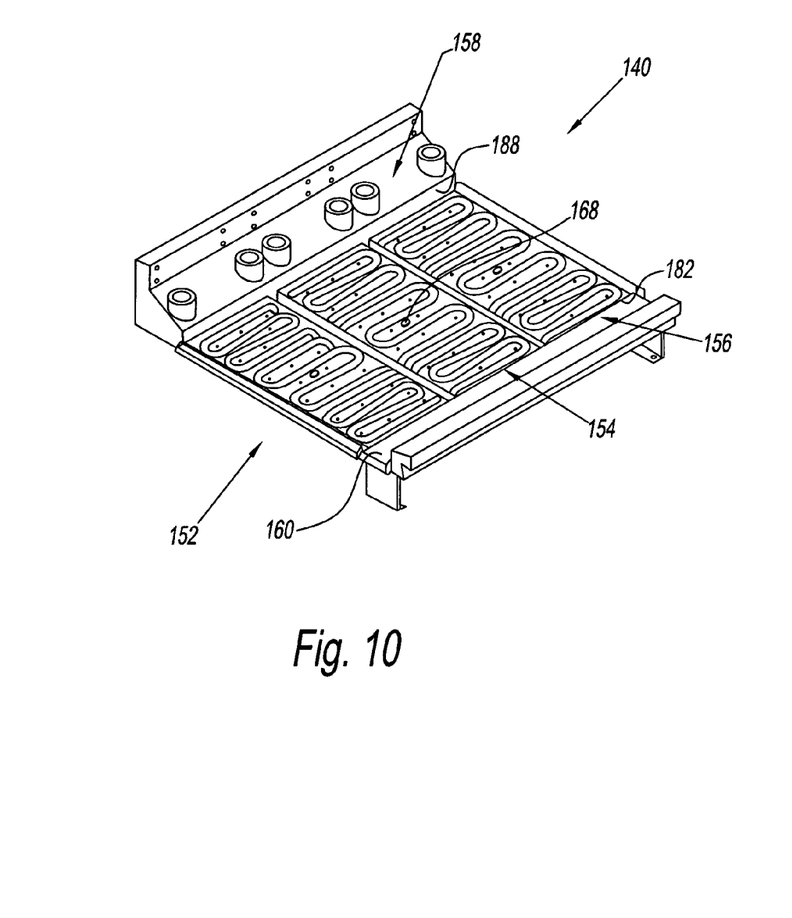
FIG. 10 is a perspective view of an electric griddle of the present invention with griddle plate removed.
Figure 11:
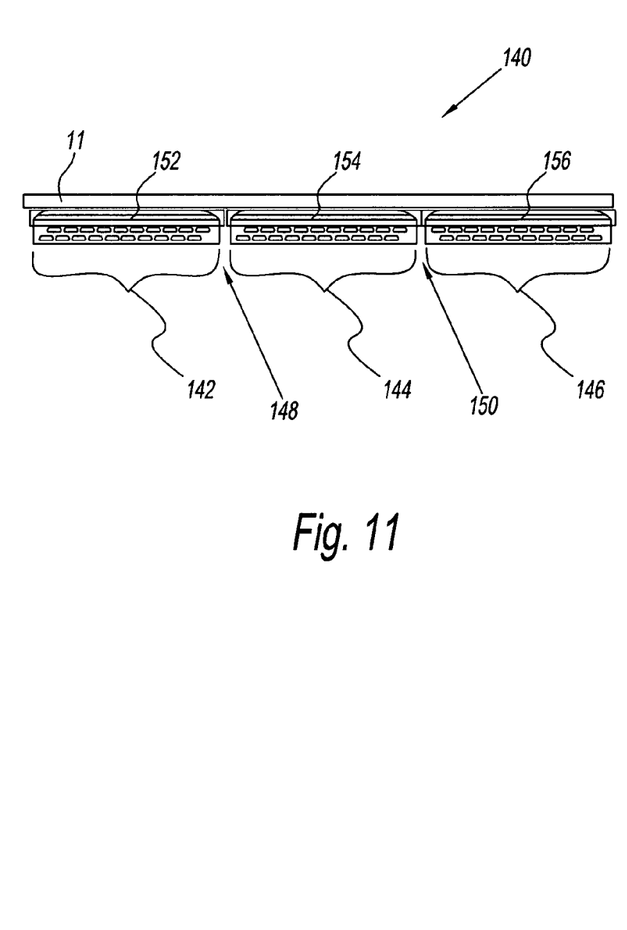
FIG. 11 is side elevation view of the electric griddle of FIG. 10 with the griddle plate in place, but with the sides removed.

Referring to FIGS. 10-13, another embodiment of the present invention is shown as an electric griddle 140. As shown in FIG. 11, electric griddle 140 includes a plurality of separate and independent heating zones 142, 144 and 146. Heating zones 142, 144 and 146 are disposed in an array adjacent platen 11. Although only three heating zones are shown in the drawing, it will be apparent to those skilled in the art that two, three or more heating zones can be used. Adjacent heating zones 142, 144 and 146 are separated from one another by air gaps 148 and 150. Air gaps 148 and 150 minimize heat migration between heating zones 142, 144 and 146.

Electric griddle 140 includes three heating units 152, 154 and 156 disposed in heating zones 142, 144 and 146, respectively. As shown in FIG. 10, heating units 152, 154 and 156 are each in thermal contact with a back heat sink 158 and a front heat sink 160. Heating units 142, 144 and 146 may be used as heating units 18 of the embodiment of FIGS. 1-3.

Figure 12:
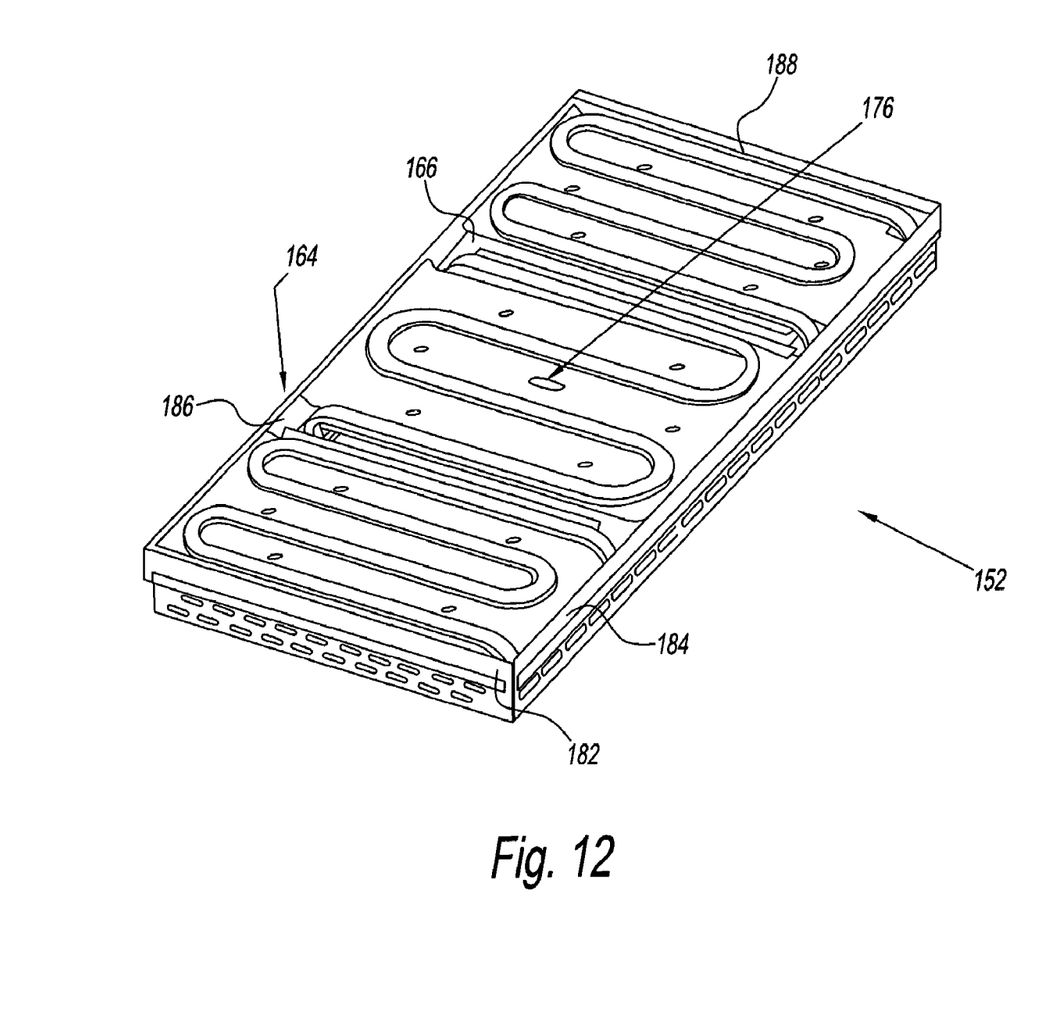
FIG. 12 is a perspective view of the zones of the electric griddle of FIG. 10.
Figure 13:
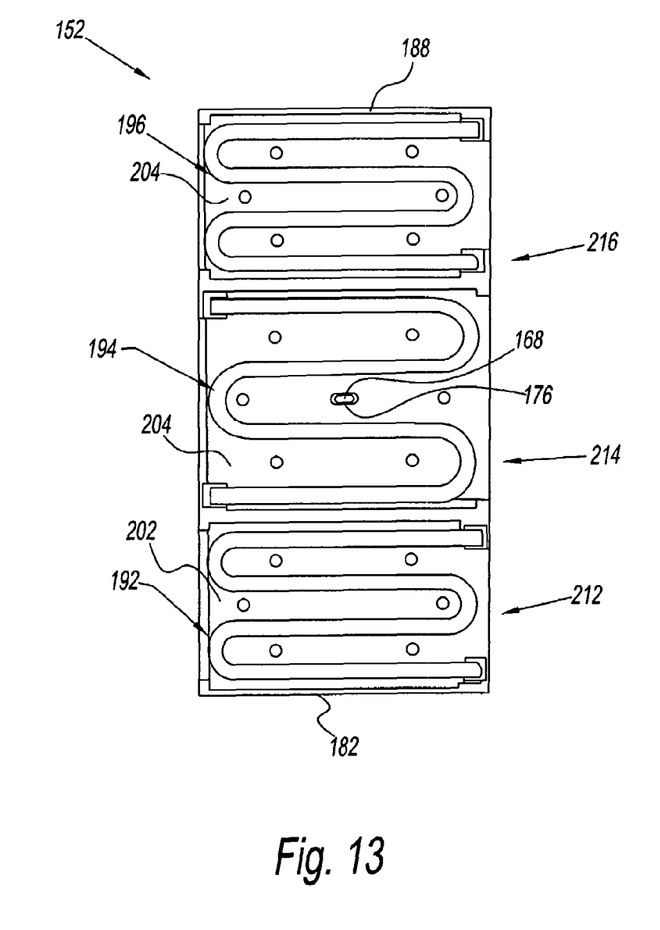
FIG. 13 is a top view of the electric griddle with griddle plate and sides removed.

Heating units 152, 154 and 156 are substantially identical so only heating unit 152 will be described in detail. Referring to FIGS. 12 and 13, heating unit 152 includes a heater box 164 in which is disposed an insulation liner 166 and three electric heating elements 170, 172 and 174. Heater box 164 includes a front wall 182, a back wall 188 and a bottom wall that is obscured in FIGS. 12 and 13. An insulation liner 166 covers the obscured bottom wall. Front wall 182 and back wall 188 are in thermal communication with front heat sink 160 and back heat sink 158, respectively, as shown in FIG. 10.

Three electric heating elements 192, 194 and 196 are disposed on trays 202, 204 and 206 in separate zones 212, 214 and 216, respectively. Each electric heating element 192, 194 and 196 preferably has a serpentine configuration. Electric heating elements 192 and 196 are disposed adjacent front wall 182 and back wall 188, respectively. Electric heating element 194 is disposed between electric heating elements 192 and 196.

A temperature sensor 168 (shown in FIG. 13) extends through bottom wall 189 and through an aperture 176 in tray 204 so as to be in thermal contact with griddle platen 11.

Zones 212, 214 and 216 are positioned in order between front wall 182 and back wall 188. Zones 212 and 216 are substantially the same size and zone 214 is larger. Electric heating element 194 in zone 214 has greater spacing between horizontal runs of the serpentine coil so as to impart lesser thermal transfer per unit area of platen 11 in the vicinity of temperature sensor 168 as compared to the lesser spacing of horizontal runs of electric heating elements 192 and 196 in zones 212 and 216. That is, electric heating elements 192 and 196 impart a greater thermal transfer per unit area.

This assures that during preheat and recovery modes temperature sensor 168 does not prematurely sense a set temperature before the portions of platen 11 outside the vicinity of temperature sensor 168 reach the set temperature. That is, heating elements 192 and 196 apply maximum heat in heating zones 212 and 216 to the portions of platen 11 that are outside the vicinity of temperature sensor 168. Heating element 194 applies minimum heat in zone 214 to the portions of platen 11 that are within the vicinity of temperature sensor 168. This allows the entire part of platen 11 in heating zone 142 to attain a substantially uniform temperature before temperature sensor 168 senses the set temperature, which then terminates the pre-heat mode or the recovery mode. This assures that platen 11 will have a mostly uniform temperature during the entire cooking process.

Electric griddle 140 has a plurality of heating zones 142, 144 and 146 that have minimal heat migration therebetween due to air gaps 148 and 150 and insulated heater units 152, 154 and 156. As a result, each heating zone can be used independently of the other heating zones with minimal heat migration from one zone to an adjacent zone. That is, heating zones 142, 144 and 146 can be operated independently, one at a time, or simultaneously in various combinations. For example, heating zone 142 can be turned on and heating zones 144 and 146 can be turned off. For this scenario, the portions of platen 11 over lying heating zones 144 and 146 will be cool enough for use as a storage area while zone 142 is used for cooking.

Although not shown in FIGS. 10-13, temperature sensor 168 may be disposed in a shield with an air gap like temperature sensor 98 in the embodiment of FIGS. 4-9.

The present invention having been thus described with particular reference to the preferred forms thereof, it will be obvious that various changes and modifications may be made therein without departing from the spirit and scope of the present invention as defined in the appended claims.

What is claimed is:

1. A grill comprising:
   a grill surface; and
   a gas burner disposed to provide heat to said grill surface, wherein said gas burner comprises a surface in which an array of elongated ports is disposed in a row of first and second orthogonal orientations on an interleaved basis, wherein said array of elongated ports is arranged to provide more heat to a peripheral part of said grill surface than to a central part of said grill surface such that during a start up or a recovery mode a temperature of the heat provided to said central part does not reach a set temperature before a temperature of the heat provided to the peripheral part reaches said set temperature.

2. The grill of claim 1, further comprising a temperature sensor disposed to sense said temperature of the heat provided by said gas burner to said central part.

3. The grill of claim 1, wherein first and second groups of said elongated ports are disposed inside said central part and said peripheral part, respectively, and wherein said first group has a smaller number of ports than said second group.

4. The grill of claim 1, wherein said grill surface is a surface of a platen.

5. The grill of claim 1, wherein said gas burner surface extends along four legs of a rectangular frame such that said row is disposed in each of said legs.

6. The grill of claim 5, wherein a number of said elongated ports per unit area disposed in said gas burner surface in said first part is less than a number of elongated ports per unit area in said peripheral part.

7. A grill comprising:
   a grill surface comprising a central part and a peripheral part;
   a heater disposed to provide heat to said grill surface;
   a temperature sensor disposed to sense a temperature of heat provided by said heater to said central part of said grill surface; and
   wherein said heater comprises a structure that provides more heat to said peripheral part than to said central part of said grill surface such that during a start up mode or a recovery mode the sensed temperature of the heat provided to said central part does not reach a set temperature before the heat provided to said peripheral part reaches the set temperature.

8. The grill of claim 7, wherein said heater comprises a gas burner.

9. The grill of claim 8, wherein said gas burner comprises a surface in which an array of elongated ports is disposed in a row of first and second orthogonal orientations on an interleaved basis.

10. The grill of claim 9, wherein a number of said elongated ports per unit area disposed in said gas burner surface in said central part is less than a number of elongated ports per unit area in said peripheral part.

11. The grill of claim 7, wherein said temperature sensor is disposed in a shield and separated therefrom by an air gap.

12. The grill of claim 7, wherein said heater comprises an electrical heater comprising a first electrical element and a second electrical element disposed to provide said minimal and maximum heat to said first and second portions, respectively, of said grill surface.

13. The grill of claim 12, wherein adjacent runs of said first electrical element have a larger spacing than adjacent runs of said second electrical element.

\* \* \* \* \*